(12) United States Patent
Guichard et al.

(10) Patent No.: US 7,439,211 B2
(45) Date of Patent: Oct. 21, 2008

(54) METHOD FOR PREPARING A LUBRICATING COMPOSITION BASED ON POLYSILOXANES NOT RELEASING HYDROGEN

(75) Inventors: Gérald Guichard, Givors (FR); Ian Hawkins, Vaugneray (FR)

(73) Assignee: Rhodia Chimie, Aubervilliers (FR)

( * ) Notice: Subject to any disclaimer, the term of this patent is extended or adjusted under 35 U.S.C. 154(b) by 775 days.

(21) Appl. No.: 10/478,329

(22) PCT Filed: May 22, 2002

(86) PCT No.: PCT/FR02/01723

§ 371 (c)(1), (2), (4) Date: May 27, 2004

(87) PCT Pub. No.: WO02/094971

PCT Pub. Date: Nov. 28, 2002

(65) Prior Publication Data

US 2004/0209785 A1 Oct. 21, 2004

(30) Foreign Application Priority Data

May 23, 2001 (FR) .................................. 01 06816

(51) Int. Cl.
*C10M 173/02* (2006.01)
(52) U.S. Cl. ........................ 508/208; 508/201; 508/204; 508/206; 508/211; 508/213; 106/38.22
(58) Field of Classification Search .................. 508/208; 106/38.22
See application file for complete search history.

(56) References Cited

U.S. PATENT DOCUMENTS

| 4,554,122 | A | | 11/1985 | Allardice | |
|---|---|---|---|---|---|
| RE32,318 | E | * | 12/1986 | Comper et al. | 106/38.22 |
| 5,431,832 | A | * | 7/1995 | Crowe et al. | 508/208 |
| 6,491,981 | B1 | * | 12/2002 | Guichard et al. | 427/387 |
| 6,696,392 | B2 | * | 2/2004 | Naik et al. | 508/121 |
| 6,825,153 | B2 | * | 11/2004 | Giraud et al. | 508/208 |
| 6,846,780 | B2 | * | 1/2005 | Giraud et al. | 508/201 |
| 6,933,263 | B2 | * | 8/2005 | Manka et al. | 508/154 |

FOREIGN PATENT DOCUMENTS

| EP | 0 399 526 | A | 11/1990 |
|---|---|---|---|
| EP | 0 635 559 | A | 1/1995 |
| EP | 0 279 372 | A | 8/1998 |
| EP | 1 000 989 | A | 5/2000 |

* cited by examiner

*Primary Examiner*—Ellen M. McAvoy
(74) *Attorney, Agent, or Firm*—Buchanan, Ingersoll & Rooney, PC

(57) ABSTRACT

The invention concerns a method for preparing a lubricating composition, characterised in that it comprises mixing two previously prepared oil-in-water emulsions (A) and (B): the prior emulsion (A) comprises: (a) at least a non-reactive linear polyorganosiloxane oil comprising per molecule at least 2% in number of organic substituents bound to the silicon atoms which are aryl, alkylarylene and/or arylenealkyl radicals; (b) at least a polyorganosiloxane resin bearing hydroxyl groups and comprising at least two different siloxyl units selected among those formula $(R^1)_3SiO_{1/2}(M)$, $(R^1)_2SiO_{2/2}$ (D), $R^1SiO_{3/2}(T)$ and $SiO_{4/2}(Q)$, one at least of said units being a unit T or Q, $R^1$ representing an organic substituent; (c) at least a crosslinking agent soluble in the silicone phase comprising at least two functions capable of reacting with the polyorganosiloxane resin(s) (b); (d) a condensation catalyst capable of catalysing the reaction of the constituent (b) with the constituent (c); (e) a surfactant; and (f) water; the prior emulsion (B) comprises: (a') at least a reactive linear polyorganosiloxane oil comprising at least two OH groups per molecule, and the constituents (b), (c), (d), (e) and (f) mentioned above: each of the prior emulsions (A) and (B) comprises: 5 to 95 parts by weight of constituent (a) or (a'); 0.5 to 50 parts of constituent (b); 0.1 to 20 parts of constituent (c); 0.05 to 10 parts of constituent (d); for 100 parts of the sum (a)+(b)+(c)+(d) or (a')+(b)+(c)+(d); the amounts of surfactant and water being sufficient to obtain an oil-in-water emulsion; and the weight ratio emulsion (A)/emulsion (B) ranges between 1.5 and 4.

27 Claims, No Drawings

METHOD FOR PREPARING A LUBRICATING COMPOSITION BASED ON POLYSILOXANES NOT RELEASING HYDROGEN

The invention relates to an improved method of preparation of a lubricant composition, suitable in particular for the lubrication of curing bags used in the forming and vulcanization of pneumatic or semi-pneumatic tires. The invention also relates to the lubricant compositions thus obtained. It further relates to their use for the lubrication of various articles, in particular curing bags as well as pneumatic or semi-pneumatic tires. It also relates to various articles, in particular curing bags as well as pneumatic or semi-pneumatic tires, coated with said lubricant composition.

Rubber tires for vehicles are usually manufactured by molding and vulcanizing a raw (or uncured) and unformed casing in a molding press in which the raw casing is forced outwards against the surface of a mold by means of a bag or bladder that can be inflated by an internal fluid. By this process, the raw casing is shaped against the external surface of the mold which determines the tread pattern of the casing and the configuration of the sides. The casing is vulcanized by heating. In general, the bag is inflated by the internal pressure supplied by a fluid such as a hot gas, hot water and/or steam, which also contributes to heat transfer for vulcanization. Then the casing is left to cool a little in the mold, this cooling sometimes being promoted by introducing cold, or cooler, water into the bag. Then the mold is opened, the bag is deflated by releasing the pressure of the internal fluid, and the casing is removed from the casing mold. This use of casing curing bags is well known in industry.

It is assumed that a considerable relative movement occurs between the external contact surface of the bag and the internal surface of the casing during the stage of bag inflation before complete vulcanization of the casing. Moreover, there is also considerable relative movement between the external contact surface of the bag and the vulcanized internal surface of the casing, after the casing has been molded and vulcanized, during deflation and removal of the bag from the tire.

If adequate lubrication is not provided between the bag and the internal surface of the casing, the bag generally has a tendency to warp, which leads to distortion of the casing in the mold, as well as excessive wear and loss of smoothness of the surface of the bag itself. The surface of the bag also tends to adhere to the internal surface of the casing after vulcanization of the casing and in the course of the part of the casing vulcanization cycle during which the bag is deflated. Furthermore, air bubbles can become trapped between the surfaces of the bag and the casing, and promote the development of curing defects of the casings resulting from insufficient heat transfer.

For this reason, the external surface of the bag or the internal surface of the raw or unvulcanized casing is coated with an appropriate lubricant, sometimes known in French as ciment de chemisage ("jacketing cement"), to facilitate sliding, and so minimize the risks of adhesion between the external surface of the bag and the internal surface of the raw casing. Apart from excellent sliding properties, the various qualities one expects from a good lubricant composition are that it should have excellent properties of durability (the durability of a lubricant composition corresponds to the number of tires produced without degradation of the external surface of the bag) and excellent properties of elasticity (characterized by an elongation at break in tension of the film of crosslinked lubricant composition equal to at least 200%, measured according to standard AFNOR-T 46002).

Numerous lubricant compositions have been proposed for this purpose in the industry.

In particular, the lubricant compositions described in FR-A-2 494 294 are known. These contain, as main constituents, a reactive polydimethylsiloxane, preferably with hydroxyl terminal groups, a crosslinking agent preferably containing Si—H functions and possibly a polycondensation catalyst.

Examples of crosslinking agent with Si—H function(s) are methyltrihydrogen-silane and dimethyldihydrogen-silane. The drawback of lubricant compositions of this type is their instability in storage. In fact creaming of the emulsion occurs as a result of release of hydrogen during transport and storage of the lubricant composition. Release of hydrogen, which is responsible for the instability of the compositions of the prior art, results essentially from decomposition of the constituents with Si—H function(s).

The preparation of lubricant compositions from constituents that do not contain an Si—H function, but still possess excellent properties of sliding, durability and elasticity, is therefore highly desirable.

The compositions described in EP-A-0 635 559 are lubricant compositions based on polysiloxanes, which partly meet these requirements. These compositions are much more stable, as they do not release hydrogen during storage.

These compositions, which are in the form of emulsions, have as main constituents an unreactive polydimethylsiloxane, a reactive polydimethylsiloxane, preferably with hydroxy or alkoxy termination, and a crosslinking agent based on a hydrolyzable organosilane. However, their durability is insufficient for practical use in the production of pneumatic or semi-pneumatic tires.

The present invention provides an improved method of preparation of an improved lubricant composition that does not emit hydrogen and in addition has excellent properties of sliding, durability and elasticity, making them perfectly suitable in particular for the lubrication of curing bags in the molding and vulcanization of pneumatic and semi-pneumatic tires.

More precisely, the present invention relates to a method of preparation of a lubricant composition in the form of an oil-in-water emulsion, characterized in that it comprises direct mixing of two oil-in-water emulsions (A) and (B) made beforehand, said preliminary emulsions (A) and (B) complying with the following compositional characteristics (i) to (4i):

(i) preliminary emulsion (A) contains:
  (a) at least one unreactive, linear polyorganosiloxane oil with lubricant properties, with a dynamic viscosity of the order of $5.10^{-2}$ to $30.10^2$ Pa.s at 25° C. and consisting of a linear homopolymer or copolymer:
    of which, per molecule, the monovalent organic substituents, which may be identical to or different from one another, bound to the silicon atoms, are selected from the alkyl, cycloalkyl, alkenyl, aryl, alkarylene and aralkylene radicals,
    and, preferably, of which, per molecule, at least 2% in number of said monovalent organic substituents bound to the silicon atoms are aryl, alkarylene and/or aralkylene radicals;
  (b) at least one polyorganosiloxane resin bearing, before emulsification, condensable hydroxyl substituents and containing, before emulsification, at least two different siloxyl units selected from those of formula $(R^1)_3SiO_{1/2}(M)$; $(R^1)_2SiO_{2/2}(D)$; $R^1SiO_{3/2}(T)$ and $SiO_{4/2}(Q)$, at least one of these units being a T or Q unit, and $R^1$ in these formulae representing a monovalent organic substituent, the average number per molecule of organic radicals $R^1$ per silicon atom being between 1 and 2; and said resin having a content by weight of hydroxyl substituents ranging from 0.1 to 10 wt. % and, preferably, from 0.2 to 5 wt. %;

(c) at least one crosslinking agent that is soluble in the silicone phase and has at least two functions capable of reacting with the polyorganosiloxane resin(s) (b);

(d) a condensation catalyst capable of catalyzing the reaction of constituent (b) with constituent (c);

(e) a surfactant; and (f) water, (2i) preliminary emulsion (B) contains:

(a') at least one reactive linear polyorganosiloxane oil containing at least two OH groups per molecule and with a dynamic viscosity in the range from $5.10^{-2}$ to $30.10^2$ Pa.s at 25° C.; and the constituents (b), (c), (d), (e) and (f) mentioned above in relation to the composition of preliminary emulsion (A);

(3i) each of the preliminary emulsions (A) and (B) has the following composition by weight, and the composition by weight of (A) can be identical to or different from that of (B):

from 5 to 95 parts by weight of constituent (a) for emulsion (A) or of constituent (a') for emulsion (B);

from 0.5 to 50 parts by weight of constituent (b);

from 0.1 to 20 parts by weight of constituent (c);

from 0.05 to 10 parts by weight of constituent (d);

per 100 parts by weight of the total of the constituents (a)+(b)+(c)+(d) or (a')+(b)+(c)+(d);

the quantities of surfactants and of water being sufficient to obtain an oil-in-water emulsion; and (4i) the weight ratio of emulsion (A) to emulsion (B), at the time of mixing of the preliminary emulsions, is in the range from 1.5 to 4, preferably from 1.8 to 3, and more preferably from 2.1 to 2.6.

The constituents (a), (a'), (b), (c), (d) and (e) of the emulsions are defined with reference to their initial chemical structure, i.e. that which characterizes them before emulsification. Once they are in an aqueous environment, the structure of the constituents is likely to be altered considerably as a result of reactions of hydrolysis and condensation.

By dynamic viscosity we mean, within the scope of the invention, viscosity of the Newtonian type, i.e. the dynamic viscosity measured in a well-known manner at a given temperature, at a shear rate gradient sufficiently low for the measured viscosity to be independent of the rate gradient.

Each of the unreactive polydiorganosiloxane oils of constituent (a) has a dynamic viscosity that is generally between $5.10^{-2}$ and $30.10^2$ Pa.s at 25° C. Preferably, the dynamic viscosity is in the range from $5.10^{-2}$ to 30 Pa.s, better still between 0.1 and 5 Pa.s.

Within the scope of the invention, "unreactive" means an oil which, in the conditions of emulsification, preparation of the lubricant composition and application, does not react chemically with any of the constituents of the composition.

As preferred constituent (a), we may mention the linear polyorganosiloxanes:

consisting along each chain:
of units of formula $R^2R^3SiO_{2/2}$, possibly combined with units of formula $(R^2)_2SiO_{2/2}$,
of units of formula $(R^3)_2SiO_{2/2}$, possibly combined with units of formula $(R^2)_2SiO_{2/2}$, and
of units of formula $R^2R^3SiO_{2/2}$ and units of formula $(R^3)_2SiO_{2/2}$, possibly combined with units of formula $(R^2)_2SiO_{2/2}$,
and blocked at each chain end by a unit of formula $(R^4)_3SiO_{1/2}$ in which the radicals $R^4$, which may be identical or different, are radicals $R^2$ and $R^3$;

where the radicals $R^2$ and $R^3$, monovalent organic substituents of the various siloxyl units mentioned above, have the following definitions:

the radicals $R^2$, identical to or different from one another, are selected from: the linear or branched $C_1$-$C_6$alkyl radicals (for example methyl, ethyl, propyl, isopropyl, butyl, isobutyl, t-butyl, n-pentyl, n-hexyl), the $C_3$-$C_8$ cycloalkyl radicals (for example cyclopentyl, cyclohexyl), and the linear or branched $C_2$-$C_8$ alkenyl radicals (for example vinyl, allyl), the radicals $R^3$, identical to or different from one another, are selected from: the $C_6$-$C_{10}$ aryl radicals (for example phenyl, naphthyl), the $C_6$-$C_{15}$ alkarylene radicals (for example tolyls, xylyl), the $C_6$-$C_{15}$ aralkylene radicals (for example benzyl); and where 5 to 50%, and preferably 8 to 35%, by number of the substituents $R^2$, $R^3$ and $R^4$ are aromatic radicals. $R^3$.

The presence in the polyorganosiloxane(s) forming constituent (a), mixed with the appropriate siloxyl radicals mentioned above, of units of different structure, for example of formula $R^4SiO_{3/2}$ and/or $SiO_{4/2}$, is not excluded in the proportion of at most 2% (this percentage expressing the number of units $R^4SiO_{3/2}$ and/or $SiO_{4/2}$ per 100 silicon atoms).

More preferably, constituent (a) consists of at least one linear polyorganosiloxane:

constituted along each chain:
of units of formula $R^2R^3SiO_{2/2}$ combined with units of formula $(R^2)_2SiO_{2/2}$,
of units of formula $(R^3)_2SiO_{2/2}$ combined with units of formula $(R^2)_2SiO_{2/2}$;
and blocked at each chain end by a unit of formula $(R^2)_3SiO_{1/2}$;

where the radicals $R^2$ and $R^3$ have the following definitions:

the radicals $R^2$, identical to or different from one another, are selected from the methyl, ethyl, propyl and isopropyl radicals, the radicals $R^3$, identical to or different from one another, are selected from the phenyl, tolyl and benzyl radicals; and where 5 to 50%, and preferably 8 to 35%, by number of the substituents $R^2$ and $R^3$ are phenyl, tolyl and/or benzyl radicals.

Advantageously, at least one linear polyorganosiloxane having, per molecule, a ratio (by number) of aromatic substituents $R^3$/Si at least equal to 0.04, preferably in the range from 0.09 to 1 and better still from 0.16 to 0.7, is used as constituent (a).

Constituent (a) is generally added to preliminary emulsion (A) at a rate of 5 to 95 parts by weight per 100 parts by weight of the mixture of constituents (a)+(b)+(c)+(d), preferably at a rate of 50 to 95, and better still at a rate of 75 to 95.

Each of the reactive linear polydiorganosiloxane oils of constituent (a') has at least two OH groups per molecule, and possesses a dynamic viscosity at 25° C. generally between $5.10^{-2}$ and $30.10^2$ Pa.s. Preferably, the viscosity varies between $5.10^2$ and 30 Pa.s, better still between 0.1 and 5 Pa.s.

Within the scope of the invention, the term "reactive" denotes the reactivity of constituent (a') with respect to the crosslinking agents (c) and/or (g) present in preliminary emulsions (A) and (B); the optional constituent (g) will be defined later on in this specification.

Preferably, constituent (a') reacts with the crosslinking agent in the conditions of preparation of the emulsion.

The monovalent organic substituents of oil (a') are: linear or branched alkyl radicals; linear or branched alkenyl radicals; cycloalkyl or cycloalkenyl radicals; cycloalkylalkylene or cycloalkenylalkylene radicals; these radicals are possibly substituted by —OH and/or amino groups (possibly substituted) and/or halogen and/or cyano. The substituent of the amino group can be an alkyl radical, a cycloalkyl radical or a cycloalkylalkylene radical.

As halogen we may mention chlorine, fluorine, bromine or iodine, with fluorine more specifically appropriate.

Advantageously, the organic substituents of the oil(s) (a') are:. $C_1$-$C_6$ alkyl radicals; $C_3$-$C_8$ cycloalkyl radicals; $C_2$-$C_8$ alkenyl radicals; or $C_5$-$C_8$ cycloalkenyl radicals; said radicals possibly being substituted by hydroxyl and/or amino (possibly substituted), and/or halogen, and/or cyano.

The substituents of the amino group are for example: $(C_1$-$C_6)$alkyl; $(C_2$-$C_8)$alkenyl; $(C_3$-$C_8)$cycloalkyl.

We may mention, as preferred constituent (a'), the linear polyorganosiloxanes of formula:

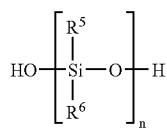

in which n is an integer greater than or equal to 10, $R^5$ and $R^6$, identical or different, represent: $(C_1$-$C_6)$alkyl; $(C_3$-$C_8)$cycloalkyl; $(C_2$-$C_8)$alkenyl; $(C_5$-$C_8)$cycloalkenyl; each of the aforesaid radicals possibly being substituted by a halogen atom (and preferably fluorine) or a cyano residue.

The oils of constituent (a') that are used most, owing to their availability in industrial products, are those for which $R^5$ and $R^6$ are selected independently of one another from methyl, ethyl, propyl, isopropyl, cyclohexyl, vinyl and 3,3,3-trifluoropropyl. Very preferably, 80% by number of these radicals are methyl radicals.

In practice, preference will be given, as oil(s) (a'), to the α,ω-dihydroxypolydimethylsiloxanes, and in particular the oils of this type prepared by the method of anionic polymerization described in the aforementioned US patents: U.S. Pat. No. 2,891,920 and especially U.S. Pat. No. 3,294,725 (cited as reference).

Constituent (a') is added to preliminary emulsion (B) at a rate of 5 to 95 parts by weight per 100 parts by weight of the mixture of constituents (a')+(b)+(c)+(d), preferably at a rate of 50 to 95, better still at a rate of 75 to 95.

Constituent (b) is formed from at least one polyorganosiloxane resin, bearing, before emulsification, condensable hydroxyl groups.

In the units of which these resins are constituted, each substituent $R^1$ represents a monovalent organic group.

In general, $R^1$ is a $C_1$-$C_{20}$ hydrocarbon radical possibly bearing one or more substituents.

Examples of hydrocarbon radicals are: an alkyl radical, linear or branched, with from 1 to 6 carbon atoms; an alkenyl radical, linear or branched, with from 2 to 8 carbon atoms; a cycloalkyl radical with from 3 to 8 carbon atoms; or a cycloalkenyl radical with from 5 to 8 carbon atoms.

The substituents of the hydrocarbon radical can be —OR' or —O—CO—R' groups in which R' is a hydrocarbon radical as defined above for $R^1$, unsubstituted.

Other possible substituents of the hydrocarbon radical are amine, amide, epoxide or ureido functions.

Examples of substituents of the hydrocarbon radical include the amine functions of formula:
—$R_a$—$NR^7R^8$ in which:

$R_a$ represents a valence bond or represents a divalent $C_1$-$C_{10}$ alkylene radical, linear or branched;
and $R^7$ and $R^8$ represent, independently: H; a $(C_1$-$C_6)$ alkyl radical; a $(C_3$-$C_8)$cycloalkyl radical; or a $(C_6$-$C_{10})$aryl radical;
—$R_b$—NH—$R_c$—$NR^7R^8$ in which $R_b$ and $R_c$, identical or different, are as defined for $R_a$ above; and $R^7$ and $R^8$ are as defined above;
the function of formula:

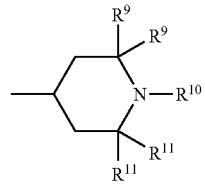

in which $R^9$ and $R^{11}$, identical or different, represent:
$(C_1$-$C_3)$alkyl and for example methyl; or $(C_6$-$C_{10})$aryl and for example phenyl;
$R^{10}$ represents: a hydrogen atom; $(C_1$-$C_6)$alkyl, for example methyl; $(C_2$-$C_7)$alkylcarbonyl; $(C_6$-$C_{10})$aryl and for example phenyl; $(C_6$-$C_{10})$aryl-$(C_1$-$C_6)$alkylene and for example benzyl; or
alternatively $R^{10}$ represents O; and
the function of formula:

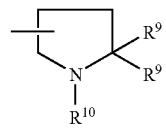

in which $R^9$ and $R^{10}$ are as defined above.
It is, however, preferable that the concentration of —OR', —O—CO—R', amine, amide, epoxide or ureido functions, when they are present in the resin, should be limited so as not to exceed the tolerance threshold beyond which the stability of the emulsion would be compromised.

The silicone resins (b) are well-known branched organopolysiloxane polymers, the methods of preparation of which are described in a number of patents. As concrete examples of resins that can be used, we may mention the MQ, MDQ, DQ, DT and MDT hydroxylated resins and their mixtures. In these resins, each OH group is carried by a silicon atom belonging to an M, D or T unit.

Preferably, as examples of resins that can be used, we may mention hydroxylated organopolysiloxane resins that do not have a Q unit in their structure. More preferably, we may mention the DT and MDT hydroxylated resins containing at least 20 wt. % of T units and having a content by weight of hydroxyl groups in the range from 0.1 to 10% and, preferably, from 0.2 to 5%. In this group of more preferred resins, those in which the average number of substituents $R^1$ per silicon atom is, per molecule, between 1.2 and 1.8, are more particularly suitable. Even more advantageously, resins of this type are used in whose structure at least 80% by number of substituents $R^1$ are methyl radicals.

Resin (b) is liquid at room temperature. Preferably, the resin has a dynamic viscosity at 25° C. in the range from 0.2 to 200 Pa.s.

The resin is incorporated in the preliminary emulsions (A) and (B) at a rate of 0.5 to 50 parts by weight per 100 parts by weight of the sum of the constituents (a), (b), (c) and (d) or (a'), (b), (c) and (d), preferably at a rate of 3 to 30, better still from 5 to 15 parts by weight.

Constituent (c), consisting of at least one crosslinking agent soluble in the silicone phase, contains at least two functions that are capable of reacting with resin(s) (b) so as to cause crosslinking of the resin(s). Advantageously, said reactive functions of the crosslinking agent react with the resin in the conditions of preparation of the emulsion.

We may mention, as preferred constituent (c), the crosslinking agents of formula:

$$Y_a Si(Zi)_{4-a}$$

in which:
a is 0, 1 or 2;
Y is a monovalent organic group; and
the groups Zi, identical or different, are selected from:

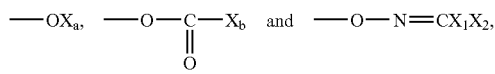

in which $X_a$, $X_b$, $X_1$ and $X_2$ are, independently, linear or branched $C_1$-$C_{10}$ alkyl radicals; it being understood that $X_1$ and $X_2$ can in addition represent hydrogen and that $X_a$ is a radical that is possibly substituted by ($C_1$-$C_3$)alkoxy.

According to a more preferred embodiment of the invention, "a" represents 0 or 1, in such a way that the formula of the crosslinking agent is: $Si(Zi)_4$ or $YSi(Zi)_3$.

More preferably, the groups Zi are identical to one another.

A more preferred group of crosslinking agents comprises in particular the set of the organotrialkoxysilanes, the organotriacyloxysilanes, the organotrioximosilanes and the tetraalkyl silicates.

Regarding the Y groups, more particularly the following radicals are selected: ($C_1$-$C_6$)alkyl; ($C_2$-$C_8$)alkenyl; ($C_3$-$C_8$) cycloalkyl; ($C_6$-$C_{10}$)aryl; ($C_6$-$C_{15}$)alkarylene; or ($C_6$-$C_{15}$) aralkylene.

As examples of Y groups, we may mention the methyl, ethyl, vinyl or phenyl radicals.

The Zi groups are selected advantageously from ($C_1$-$C_{10}$) alkoxy; ($C_1$-$C_{10}$)alkoxy-($C_1$-$C_3$)alkoxy; ($C_1$-$C_{10}$)alkylcarbonyloxy; or an oxime group —O—N=$CX_1X_2$ in which $X_1$ and $X_2$ are independently H or ($C_1$-$C_{10}$)alkyl.

Preferably, Zi represents methoxy, ethoxy, propoxy, methoxyethoxy, acetoxy or an oxime group.

As specially preferred constituent (c), we may mention the alkyltrialkoxysilane(s) of formula $YSi(Zi)_3$ in which Y is ($C_1$-$C_6$)alkyl or ($C_2$-$C_8$)alkenyl and Zi is ($C_1$-$C_{10}$)alkoxy.

Among these, we may mention methyltrimethoxysilane, methyltriethoxysilane, ethyltriethoxysilane and/or vinyltrimethoxysilane.

Each preliminary emulsion (A) and (B) contains from 0.1 to 20 parts by weight, per 100 parts by weight of the sum of the constituents (a)+(b)+(c)+(d) or (a')+(b)+(c)+(d), of constituent (c), preferably from 0.2 to 10 parts by weight, better still from 0.5 to 5.

The condensation catalyst (d) is selected from those conventionally used in the industry for catalyzing the crosslinking of resins of type (b) using crosslinking agents of type (c) defined above.

Examples of catalysts that can be used in the invention are organometal salts, and titanates such as tetrabutyl orthotitanate. As organometal salt, we may mention zirconium naphthenate and zirconium octylate.

Said catalyst is preferably a tin-based catalytic compound, generally an organotin salt.

The organotin salts that can be used are described in particular in the work of Noll, Chemistry and Technology of Silicones, Academic Press (1968), page 337. We may also define, as tin-based catalytic compound, either distannoxanes, or polyorganostannoxanes, or the product of reaction of a tin salt, in particular a tin dicarboxylate on ethyl polysilicate, as described in patent U.S. Pat. No. 3,862,919.

The product of reaction of an alkyl silicate or of an alkyltrialkoxysilane on dibutyltin diacetate as described in Belgian patent BE-A-842 305, may also be suitable.

According to another embodiment, a tin(II) salt, such as $SnCl_2$ or stannous octoate, is used.

Advantageously, the catalyst is a tin salt of an organic acid, such as dibutyltin diacetate, dibutyltin dilaurate, dioctyltin dilaurate, dibutyltin dioctate, zinc naphthenate, cobalt naphthenate, zinc octylate, cobalt octylate and dioctyltin di(isomercaptoacetate).

The preferred tin salts are the bis-chelates of tin (EP-A-147 323 and EP-A-235 049), the diorganotin dicarboxylates and, in particular, the diversatates of dibutyl- or of dioctyltin (British patent GB-A-1 289 900, the diacetate of dibutyl- or dioctyltin, the dilaurate of dibutyl- or of dioctyltin or the products of hydrolysis of precipitated species (for example the diorgano and polystannoxanes).

Catalyst (d) is generally added to each of the preliminary emulsions (A) and (B) at a rate of 0.05 to 10 parts by weight, per 100 parts by weight of the sum of the constituents (a)+ (b)+(c)+(d) or (a')+(b)+(c)+(d), preferably at a rate of 0.08 to 5 parts by weight, and better still from 0.1 to 2 parts by weight.

Dioctyltin dilaurate is quite especially preferred.

The type of surfactant (e) will easily be determined by a person skilled in the art, the objective being to prepare a stable emulsion.

Anionic, cationic, non-ionic and zwitterionic surfactants can be used, individually or mixed together.

As anionic surfactant, we may mention the alkali metal salts of aromatic sulfonic carboxylic acids or the alkali metal salts of alkylsulfuric acids.

The non-ionic surfactants are more particularly preferred within the scope of the invention. Among them, we may mention the alkyl or aryl ethers of poly(alkylene oxide), polyoxyethylene sorbitan hexastearate, polyoxyethylene sorbitan oleate with a saponification number from 102 to 108 and a hydroxyl index from 25 to 35 and the cetylstearyl and poly (ethylene oxide) ethers.

Polyoxyethylene alkylphenols may be mentioned as aryl ether of poly(alkylene oxide). The isodecyl ether of polyethyleneglycol and the trimethylnonyl ether of polyethyleneglycol containing from 3 to 15 ethylene oxide units per molecule may be mentioned as alkyl ether of poly(alkylene oxide).

The quantity of surfactant (e) is a function of the type of each of the constituents present as well as the actual nature of the surfactant used. As a general rule, each preliminary emulsion contains from 0.5 to 10 wt. % of surfactant (better still from 0.5 to 5 wt. %) and from 40 to 95 wt. % of water (better still from 45 to 90 wt. %).

Advantageously, each preliminary emulsion (A) and (B) or just one of the two preliminary emulsions (A) or (B) can additionally contain a constituent (g) consisting of at least one water-soluble crosslinking agent selected from the silanes and/or the hydroxylated polydiorganosiloxanes, said crosslinking agent bearing, per molecule, in addition to at least one OH group, at least one organic group with an Fr function, with Fr representing an amino function, possibly substituted, epoxy, acryloyl (—$CH_2$=CH—CO—) function, possibly substituted, methacryloyl (—CH₂=C(CH₃)— CO—) function, possibly substituted, ureido (NH₂—CO— NH—) function, possibly substituted, thiol function, possibly substituted or halogen.

In the sense of the present invention, water solubility is to be understood as the ability of a product to dissolve in water at a temperature of 25° C., to an extent of at least 5 wt. %.

The possible organic substituents of the crosslinking agent other than the OH group or groups and the organic group or groups with function Fr, are: linear or branched alkyl radicals with from 1 to 6 carbon atoms; cycloalkyl radicals with from 3 to 8 carbon atoms; linear or branched alkenyl radicals with from 2 to 8 carbon atoms; aryl radicals with from 6 to 10 carbon atoms; alkarylene radicals with from 6 to 15 carbon atoms; or aralkylene radicals with from 6 to 15 carbon atoms.

According to a preferred embodiment of the invention, Fr is an amino function, possibly substituted.

Thus, a preferred organic group with function Fr is a group of formula:

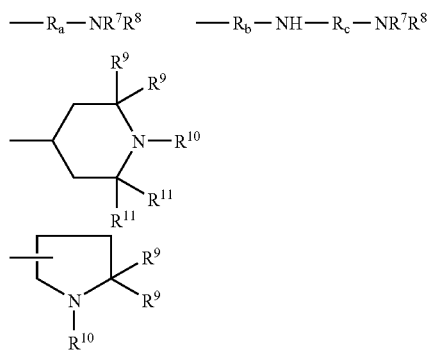

where $R_a$, $R_b$, $R_c$, $R^7$, $R^8$, $R^9$, $R^{10}$ and $R^{11}$ are as defined above in connection with the definition of constituent (b).

According to a more preferred embodiment of the invention, the water-soluble crosslinking agent has the formula:

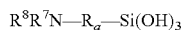

in which $R_a$, $R^7$ and $R^8$ are as defined above. Even more preferably, $R_a$ represents $(C_1$-$C_{10})$alkylene, and $R^7$ and $R^8$ represent independently a hydrogen atom or a $(C_1$-$C_6)$alkyl group.

As an example, we may mention 3-aminopropyltrihydroxysilane.

The water-soluble crosslinking agent can also be a linear and/or cyclic hydroxylated polydiorganosiloxane, with siloxyl units MD (if linear) and/or D (if cyclic), and/or a hydroxylated polydiorganosiloxane resin having, in its structure, siloxyl units T, possibly together with units M and/or D and/or T, or alternatively siloxyl units Q together with units M and/or D.

This linear, cyclic crosslinked polydiorganosiloxane is not substituted by hydrolyzable organic functions such as alkoxy functions.

In these polydiorganosiloxanes, the siloxyl units M, D, T and Q are defined as follows:
unit $M=G_3SiO_{1/2}$
unit $D=G_2SiO_{2/2}$
unit $T=GSiO_{3/2}$
unit $Q=SiO_{4/2}$, G being an organic substituent conforming to the definition given previously for the "possible organic substituents" or alternatively represents a hydroxyl group or it is a function Fr, it being understood that in each molecular structure, at least one of the symbols G represents a hydroxyl group and at least one other of the symbols G represents a function Fr.

Preferably, G is: $(C_1$-$C_6)$alkyl (for example methyl, ethyl, isopropyl, t-butyl and n-hexyl); hydroxyl; $(C_2$-$C_8)$alkenyl (for example vinyl or allyl); or alternatively a function Fr, the preferred functions Fr being as defined above.

As linear hydroxylated polydiorganosiloxanes that can be used as crosslinking agent (g), we may mention polymethylsiloxane, the two ends of which have a hydroxyl and therefore each silicon atom of the chain carries a function Fr.

This constituent (g), when it is present in preliminary emulsion (A) or (B) or in both emulsions, is used at a rate of 0.5 to 15 parts by weight per 100 parts by weight of the sum of the constituents (a)+(b)+(c)+(d)+(g) or (a')+(b)+(c)+(d)+(g), preferably at a rate of 0.6 to 5 parts by weight, and better still at a rate of 0.8 to 3 parts by weight.

The presence of constituent (g) greatly improves the durability of the lubricant composition.

Each preliminary emulsion (A) and (B) or just one of the two preliminary emulsions (A) or (B) can also contain one or more additional ingredients such as film-forming polymers, additional lubricants, antifriction agents, coalescing agents, wetting or dispersing agents, mineral fillers, agents for driving out air, antifoaming agents, thickeners, stabilizers, presevatives such as biocides and antifungal agents, in amounts that can vary considerably, for example between 0.2 and 50 wt. % of the preliminary emulsion.

As film-forming polymer, we may mention for example styrene-acrylic copolymers.

Examples of thickeners are cellulosic thickeners (carboxymethylcellulose), acrylic, polyurethane, hydrocolloidal gums (xanthan gum) and their mixtures.

Glycols and/or aliphatic petroleum cuts (petroleum distillation fractions) can be used as coalescing agent.

Wetting or dispersing agents that can be used in the invention are for example phosphates and/or polyacrylics, such as sodium hexametaphosphate and sodium polyacrylates.

The preliminary emulsions (A) and (B) can be prepared in a conventional way using the classical methods of the state of the art.

A first method consists of forming an emulsion from a mixture of the lipophilic constituents (a) or (a'), (b), (c) and (d), in the presence of surfactant (e), in an aqueous phase containing all of the water-soluble constituents.

Modifications of this method can of course be envisaged. An oil-in-water pre-emulsion can be prepared first from just some of the constituents forming the final emulsion. Then the missing constituents can be added, either directly to the emulsion (in the case of water-soluble constituents), or later on in the form of emulsion (in the case of constituents that are soluble in the silicone phase).

Thus, the catalyst (d) and the film-forming polymer can be added, either directly to the silicone phase before emulsification, or after formation of the emulsion, in the form of an additional emulsion.

Emulsification can be direct or it can take place by inversion.

When the procedure involving inversion is followed, it may be advantageous to prepare a pre-emulsion that only contains a small proportion of water, effect its inversion (for example by grinding), then dilute the resulting emulsion with the rest of the water, to which possibly one or more water-soluble constituents have been added.

A preferred variant consists notably of preparing an oil-in-water pre-emulsion containing all of the constituents (a) or (a'), (b) and (c) and possibly (g), in the presence of the surfactant (e) before adding, to this pre-emulsion, the missing constituents in the form of additional emulsion(s).

Thus, according to another of its aspects, the invention relates to a method of preparing a lubricant composition in the form of an oil-in-water emulsion, characterized in that it comprises the following steps (1) and (2):

step (1) in which the preliminary emulsions (A) and (B) are prepared, at room temperature (23° C.), using the same procedure comprising the sequences α, β and γ as follows:

sequence α: form an emulsion in water (f), from a mixture of unreactive polydiorganosiloxane oil(s) (a) (in the case of emulsion (A)) or reactive polydiorganosiloxane oil(s) (a') (in the case of emulsion (B)), of polyorganosiloxane resin(s) (b), and of crosslinking agent(s) that are soluble in the silicone phase (c), in the presence of the surfactant (e), so as to prepare an emulsion of the oil-in-water type, if necessary by first preparing a thick oil-in-water phase, then secondly diluting the thick phase obtained with water, sequence β: add to the preceding emulsion, containing all of the constituents (a) or (a'), (b), (c) and (e), an emulsion of the catalyst (d) in water, sequence γ: then if necessary dilute the medium with water as a function of the desired degree of dry extract;

step (2) which comprises mixing, at room temperature (23° C.), preliminary emulsion (A) and preliminary emulsion (B), operating with moderate stirring, in the proportions that were defined above in paragraph (4i) of the compositional characteristics of the preliminary emulsions (A) and (B).

The emulsification, in sequence α, can be direct or by inversion. The procedure with inversion is preferably used.

When a water-soluble crosslinking agent (g) is incorporated in the preliminary emulsion or emulsions, it is preferably added in the form of an aqueous solution, at the same time as the catalyst (d), to an oil-in-water emulsion containing all of the constituents (a) or (a'), (b), (c) and (e).

The additional emulsion of catalyst (d) as well as any emulsion added to the emulsion resulting from sequence a is preferably prepared in the presence of the same surfactant as in sequence α. However, the use of any other type of surfactant, for example a poly(vinyl alcohol), can be envisaged. This last-mentioned surfactant can be used quite particularly in the case when we wish to prepare an additional emulsion of a tin-based catalyst.

The additional ingredient(s) mentioned above, when using one or more, can be incorporated advantageously, wholly or partly, in the preliminary emulsion or emulsions in sequence α and/or in sequence β and/or in sequence γ if present.

The method of the invention can in addition include a supplementary step of heating of the resulting lubricant composition, for example at a temperature in the range from 30 to 40° C. This step makes it possible to speed up the crosslinking process. It can be replaced by a step of storage of the lubricant composition at room temperature (23° C.) until crosslinking is complete.

The oils and resins (a), (a') and (b) as well as the crosslinking agents (c) and (g) are available commercially or are readily accessible by a person skilled in the art by employing classical methods described in the prior art.

When resin (b) or crosslinking agent (c) are functionalized, functionalization can easily be effected by an appropriate reaction of substitution or of addition.

When the optional constituent (g) represents a water-soluble hydroxylated silicone resin, this can be obtained:

by co-hydrolysis:
of at least one silane ($S_1$) substituted by functions Fr and by Hydrolyzable Organo-Functional Substituents (HOFS), which may be identical or different from one another, preferably —$OR_d$ with $R_d$=alkyl radical;
with at least one silane ($S_2$) substituted by HOFS that may be identical or different from one another and relative to those of ($S_1$), apart from substituents Fr;

by heterocondensation of the hydrolyzates derived from the silanes $S_1$ and $S_2$;

then by steam "stripping" of the hydrolyzates derived from the HOFS.

In the sense of the invention, the hydrolyzable organofunctional substituents (HOFS) that are able to generate volatile organic compounds (VOCs) in situ during crosslinking by condensation are, for example, alkoxy, acetoxy, ketiminoxy, and enoxy.

Insofar as the commonest HOFS are alkoxyls —$OR_d$, the mechanisms of heterocondensation involved are of the type OH/OH and OH/$OR_d$, these OH or $OR_d$ being carried by the hydrolyzates derived from silanes $S_1$ and $S_2$. As for the hydrolyzates derived from the HOFS, they are alcohols, in this particular case.

Thus, in practice, the silane $S_1$ is advantageously a trialkoxysilane, preferably a trimethoxysilane, a triethoxysilane, a methyldimethoxysilane or a methyldiethoxysilane, bearing an amine function Fr of the type:

3-aminopropyl;

N-methyl-3-aminopropyl;

N-aminoethyl-3-aminopropyl;

$C_6H_5CH_2NH(CH_2)_2NH$—$(CH_2)_3$—;

3-ureidopropyl;

3-methacryloxypropyl: $CH_2$=$C(CH_3)$—COO—$(CH_2)_3$—;

3-glycidyloxypropyl:

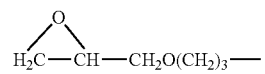

(the other substituents of Si in the crosslinking agent (g) in this case not containing HOFS)

3-mercaptopropyl;

3-chloropropyl.

With regard to $S_2$, the HOFS that it contains are preferably $C_1$-$C_6$ alkoxy radicals, for example: methoxy, ethoxy or propoxy.

This silane $S_2$, preferably an alkoxysilane, can also contain at least one $C_1$-$C_6$ alkyl substituent, for example: methyl, ethyl, propyl.

These resins produced by heterocondensation of $S_1$ and $S_2$ are described, in particular, in European patent application EP-A-0 675 128, the contents of which are incorporated by reference in the present description.

According to a second embodiment, the optional crosslinking agent (g) is a resin obtained:

by hydrolysis of a silane $S_3$ substituted by Frs and HOFS, by homocondensation of the hydrolyzed silanes $S_3$, and by steam stripping of the hydrolyzates derived from the HOFS.

Silane $S_3$ is preferably an Fr substituted alkoxysilane. For example, it may be a trialkoxysilane with which it is possible to obtain a hydroxylated resin with units T, also called T(OH) resin.

This silane $S_3$ can be of the same type as silane $S_1$ as defined above.

The functions Fr substituting $S_3$ conform to the same definition as that given above.

As an illustration of this second manner of employing a crosslinking agent (g) of the polydiorganosiloxane resin type, we may cite that obtained from γ-aminopropyltriethoxysilane, hydrolyzed and submitted to stripping of the ethanol formed by the hydrolysis. The polyhomocondensed resin obtained is a mixture of oligomers containing from 4 to 10 silicons and containing the units:

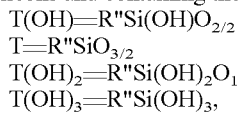

these units being present respectively in decreasing quantity, with R''=$NH_2$—$(CH_2)$—$_3$. It is for example a T(OH) amine resin.

The lubricant compositions that can be obtained using the method that has just been described, comprising direct mixing of the two emulsions (A) and (B) made beforehand, also fall within the scope of the present invention.

The invention further relates to the use of the lubricant composition thus obtained for the lubrication of various articles.

More particularly, the invention relates to the use of the lubricant composition for lubricating the inflatable curing bag, made of rubber, during the molding and vulcanization of pneumatic or semi-pneumatic tires.

The lubricant composition of the invention can be applied in any manner, for example by spraying, by brushing or using a sponge or a paint brush. It is preferable to work in such a way as to cover the article to be coated with a uniform covering layer.

Lubrication of the curing bag used during the molding and vulcanization of pneumatic or semi-pneumatic tires can be carried out in two different ways.

During manufacture of pneumatic or semi-pneumatic tires, a raw tire is placed in a tire mold, an inflatable bag is arranged in the mold, the mold is closed and the bag is inflated by application of an internal pressure of hot fluid, in such a way that the tire is pressed against the mold, and it is molded and vulcanized. The mold is then opened, the bag is deflated and the tire is recovered, shaped and vulcanized. The same bag is used for making several hundred tires.

The inflatable rubber bag used in tire manufacture is initially coated with a lubricant composition according to the invention.

At the start, lubrication of the bag is direct. There is then an effect of exhaustion of the lubricating effect of this bag.

In this later stage, it is the inside surface of the tire (that which comes into contact with the bag) that is coated with the lubricant composition. Lubrication of the rubber bag is restored by transfer from the tire.

In general, the cycles of mold pressing and release of the bag employed during tire manufacture take place as follows:
the bag initially coated with the lubricant composition (direct lubrication) and heated to 80-180° C., and preferably to 130-170° C., is used (without further coating of the bag, but by coating the first tire or the first two tires) for 5 to 10 cycles (each cycle ending in the manufacture of a different tire), then the next cycles are carried out using this same bag (for which the lubrication coating is exhausted) from pneumatic or semi-pneumatic tires which are then coated each time with the lubricant composition of the invention: in this case the bag is lubricated by transfer.

The present invention therefore also relates to the use of the lubricant composition for the lubrication of raw pneumatic or semi-pneumatic tires, with or without elements on their outer surface that will constitute the external tread that is to come into contact with the ground.

The lubricant composition of the invention does not contain any constituent with Si—H bonds, so that there is zero risk of release of hydrogen during storage or transport.

In addition, the lubricant composition of the invention has excellent properties of slip, durability and elasticity.

Advantageously, the inflatable rubber bag, before being coated on its outer surface (that which comes into contact with the tire) with a lubricant composition prepared by the method of the present invention, can undergo a pre-treatment consisting of applying, in any manner (for example by spraying, by brushing, or using a sponge or a paint brush), a uniform layer of a primary composition that is in the form of an oil-in-water emulsion, said emulsion being obtained by the method comprising the direct mixing of the two oil-in-water emulsions (A) and (B) made beforehand, which are defined above, but this time using proportions of the two preliminary emulsions (A) and (B) such that the weight ratio of emulsion (A) to emulsion (B), at the moment of direct mixing, is now in the range from 0.1 to 0.7, preferably from 0.3 to 0.5, and more preferably from 0.35 to 0.45.

The present invention further relates to articles lubricated using the lubricant composition that can be obtained by employing the method that has just been described, comprising the direct mixing of the two emulsions (A) and (B) made beforehand.

More particularly, the invention relates to:
an inflatable rubber bag coated on its outer surface with a composition according to the invention, for the molding and vulcanization of pneumatic or semi-pneumatic tires;
an inflatable rubber bag that can be obtained by heating the inflatable bag defined above, notably at 80-180° C. (preferably 130-170° C.), so as to ensure complete crosslinking of the crosslinkable constituents of the emulsion;
a raw pneumatic or semi-pneumatic tire, with or without elements that will constitute its external tread that is to come into contact with the ground, coated on its inside surface with a lubricant composition according to the invention.

The following examples illustrating the invention provide evidence of the excellent lubricating properties of the compositions of the invention.

EXAMPLE 1

This example illustrates a lubricant composition (lubricant composition 1) prepared according to the method of the present invention and containing a water-soluble crosslinking agent (constituent (g))

Step (1):

Prepare the preliminary emulsions (A) and (B), with the type and proportions of their constituents shown below in Tables 1 and 2 respectively.

TABLE 1

Emulsion (A)

| Type of constituent | Identification | Percentage by weight in the emulsion |
|---|---|---|
| Phenylated siloxane oil M-(D$^{Ph/Me}$)$_{20}$-(D)$_{80}$-M with dynamic viscosity equal to 10$^{-1}$ Pa · s at 25° C.[1] | Constituent (a) | 39.92 |
| MDT-OH resin[2] | Constituent (b) | 5.71 |
| Methyltriethoxysilane | Constituent (c) | 0.38 |
| Emulsion of dioctyltin dilaurate[3] | Constituent (d) | 0.24 |
| Polyethoxylated isotridecyl alcohol[4] | Constituent (e) | 2.71 |
| NH$_2$—(CH$_3$)$_3$—Si(OH)$_3$[5] | Constituent (g) | 2.42 |
| Antifoaming agent | | 0.20 |
| Antioxidant | | 0.05 |
| Bactericide | | 0.02 |
| Thickener (xanthan gum) | | 0.11 |
| Wetting agent | | 0.30 |
| Distilled water | | 47.94 |
| | | 100 |

[1]Phenylated siloxane oil: M = (CH$_3$)$_3$SiO$_{1/2}$ unit D = (CH$_3$)$_2$SiO$_{2/2}$ unit D$^{Ph/Me}$ = (C$_6$H$_5$)(CH$_3$)SiO$_{2/2}$ unit Ph = C$_6$H$_5$
[2]MDT resin with a degree of hydroxylation of 0.5 wt. %, an average number of organic radicals to one silicon atom per molecule of 1.5, a dynamic viscosity of 0.1 Pa · s at 25° C. and the following proportions of siloxyl units: M: 17 mol. % D: 26 mol. % T: 57 mol. %.
[3]Emulsion of dioctyltin dilaurate at 37.5 wt. % in water prepared using polyvinyl alcohol as surfactant.
[4]Mixture of 15% water and 85% ethoxylated isotridecyl alcohol per 8-9 mol of ethylene oxide per mol of isotridecyl alcohol.
[5]Aqueous solution containing 23 wt. % of silane.

TABLE 2

Emulsion (B)

| Type of constituent | Identification | Percentage by weight in the emulsion |
|---|---|---|
| Hydroxylated linear polydimethylsiloxane with (CH$_3$)$_2$(OH)SiO$_{1/2}$ terminations with dynamic viscosity equal to 0.75 Pa · s at 25° C. | Constituent (a') | 39.92 |
| MDT-OH resin[1] | Constituent (b) | 5.71 |
| Methyltriethoxysilane | Constituent (c) | 0.38 |
| Emulsion of dioctyltin dilaurate[2] | Constituent (d) | 0.24 |
| Polyethoxylated isotridecyl alcohol[3] | Constituent (e) | 2.71 |
| NH$_2$—(CH$_3$)$_3$—Si(OH)$_3$[4] | Constituent (g) | 2.42 |
| Antifoaming agent | | 0.20 |
| Antioxidant | | 0.05 |
| Bactericide | | 0.02 |
| Thickener (xanthan gum) | | 0.11 |
| Wetting agent | | 0.30 |
| Distilled water | | 47.94 |
| | | 100 |

[1]MDT resin with a degree of hydroxylation of 0.5 wt. %, an average number of organic radicals to one silicon atom per molecule of 1.5, a dynamic viscosity of 0.1 Pa · s at 25° C. and the following proportions of siloxyl units: M: 17 mol. % D: 26 mol. % T: 57 mol. %.
[2]Emulsion of dioctyltin dilaurate at 37.5 wt. % in water prepared using polyvinyl alcohol as surfactant.
[3]Mixture of 15% water and 85% ethoxylated isotridecyl alcohol per 8-9 mol of ethylene oxide per mol of isotridecyl alcohol.
[4]Aqueous solution containing 23 wt. % of silane.

The preliminary emulsions (A) and (B) are prepared following the same procedure, including the following sequences α and β:

Sequence α:

A mixture consisting of unreactive phenylated siloxane oil (in the case of emulsion (A)) or reactive hydroxylated polydimethylsiloxane oil (in the case of emulsion (B)), of the MDT-OH resin, of methyltriethoxysilane, of surfactant and some distilled water (according to a water/surfactant ratio of 1.2, i.e. 2.35 wt. % of water) is homogenized beforehand with moderate stirring (50 rev/min) for 15 minutes at room temperature (23° C.).

The mixture thus obtained is treated by grinding until phase inversion occurs, using a Moritz® grinding mill, so that the fluid water/oil phase becomes a thick oil/water phase.

The thick phase obtained is diluted under moderate stirring in 40 minutes, using a quantity of distilled water determined for obtaining an emulsion with dry matter of 50% (i.e. 45.59 wt. % of water). The bactericide and the antioxidant are added during dilution.

Sequence β:

The silane (g) and the catalyst (d) are added to the emulsion prepared above, then homogenization is carried out with moderate stirring for 10 minutes, followed by filtration.

Then the biocide and the antifoaming agent are added to the emulsion, stirring for a further 10 minutes. The emulsion thus obtained is characterized by an average grain size of 0.4 μm.

The xanthan gum and the wetting agent are loaded into another vessel, mixed for 10 minutes with vigorous stirring, and then they are added to the emulsion prepared above. Stirring is continued, at moderate speed, for 30 minutes.

The final emulsion is characterized by a proportion of dry matter (60 min, 120° C.) of 48.8 wt. %.

Step (2):

The preliminary emulsions (A) and (B), prepared as indicated previously, are mixed at room temperature (23° C.), with moderate stirring (50 rev/min) for 15 minutes, using preliminary emulsions (A) and (B) in the following respective proportions:

TABLE 3

Lubricant composition 1

| Type of emulsion | Identification | Percentage by weight in the lubricant composition |
| --- | --- | --- |
| Emulsion (A) | Table 1 | 70 |
| Emulsion (B) | Table 2 | 30 |
| | | 100 |

The lubricant composition 1 obtained is characterized by an average grain size (measured before adding the xanthan gum and the wetting agent) of 0.4 μm and a proportion of dry matter (60 min, 120° C.) of 48.8 wt. %.

EXAMPLES 2 AND 3

EXAMPLE 2

This is a comparative example illustrating a lubricant composition (lubricant composition 2) that is prepared by preparing a single emulsion directly from a mixture of constituents (a) and (a') with the other constituents and additional ingredients, rather than by carrying out the direct mixing of two preliminary emulsions (A) and (B).

Thus, a single emulsion is prepared having the type and proportions of constituents given in the following Table 4:

TABLE 4

Lubricant composition 2

| Type of constituent | Identification | Percentage by weight in the emulsion |
| --- | --- | --- |
| Phenylated siloxane oil M-($D^{Ph/Me}$)$_{20}$-(D)$_{80}$-M with dynamic viscosity equal to $10^{-1}$ Pa · s at 25° C.[1] | Constituent (a) | 27.94 |
| Hydroxylated linear polydimethylsiloxane oil with $(CH_3)_2(OH)SiO_{1/2}$ terminations with dynamic viscosity equal to 0.75 Pa · s at 25° C. | Constituent (a') Weight ratio (a)/(a') = 70/30 | 11.98 |
| MDT-OH resin[2] | Constituent (b) | 5.71 |
| Methyltriethoxysilane | Constituent (c) | 0.38 |
| Emulsion of dioctyltin dilaurate[3] | Constituent (d) | 0.24 |
| Polyethoxylated isotridecyl alcohol[4] | Constituent (e) | 2.71 |
| $NH_2$—$(CH_3)_3$—$Si(OH)_3$[5] | Constituent (g) | 2.42 |
| Antifoaming agent | | 0.20 |
| Antioxidant | | 0.05 |
| Bactericide | | 0.02 |
| Thickener (xanthan gum) | | 0.11 |
| Wetting agent | | 0.30 |
| Distilled water | | 47.94 |
| | | 100 |

Legends [1] to [5]: see bottom of Table 1.

The method used for preparing lubricant composition 2 is identical to the method, comprising sequences α and β, described in step (1) of example 1.

The emulsion obtained is characterized by an average grain size (measured before adding the xanthan gum and the wetting agent) of 0.402 μm and a proportion of dry matter (60 min, 120° C.) of 48.5 wt. %.

EXAMPLE 3

This is another comparative example illustrating a lubricant composition (lubricant composition 3) prepared once again by making a single emulsion starting from the constituents and the additional ingredients of the type and in the proportions shown in the following Table 5:

TABLE 5

Lubricant composition 3

| Type of constituent | Identification | Percentage by weight in the emulsion |
| --- | --- | --- |
| Unreactive linear polydimethylsiloxane oil with $(CH_3)_3SiO_{1/2}$ terminations with dynamic viscosity equal to 1 Pa · s at 25° C. | Constituent (a") | 39.92 |
| MDT-OH resin[1] | Constituent (b) | 5.71. |
| Methyltriethoxysilane | Constituent (c) | 0.38 |
| Emulsion of dioctyltin dilaurate[2] | Constituent (d) | 0.24 |
| Polyethoxylated isotridecyl alcohol[3] | Constituent (e) | 2.71 |
| $NH_2$—$(CH_3)_3$—$Si(OH)_3$[4] | Constituent (g) | 2.42 |
| Antifoaming agent | | 0.20 |
| Antioxidant | | 0.05 |
| Bactericide | | 0.02 |
| Thickener (xanthan gum) | | 0.11 |
| Wetting agent | | 0.30 |
| Distilled water | | 47.94 |
| | | 100 |

Legends [1] to [4]: see bottom of Table 2.

The method used for preparing lubricant composition 3 is identical to the method, comprising sequences α and β, described in step (1) of example 1.

The emulsion obtained is characterized by an average grain size (measured before adding the xanthan gum and the wetting agent) of 0.402 μm and a proportion of dry matter (60 min, 120° C.) of 48.5 wt. %.

The properties of lubricant compositions 1, 2 and 3 of examples 1 (Table 3), 2 (Table 4) and 3 (Table 5) were measured by evaluating the coefficients of friction and the durability.

A low coefficient of friction reflects good properties of slip.

The tests for measuring the coefficients of friction and the durability were adapted for application of the lubricant composition on the inflatable rubber bag.

Sliding Test

The purpose of this test is to assess the sliding capacity of a lubricant composition positioned at the interface between the inflatable bag and the inside surface of the casing of a pneumatic tire.

This test is performed by causing a metal block of defined weight, under which a film of tire casing is fixed (50×70 mm), to slide on a rubber surface with the same composition as the inflatable bag.

The surface of the inflatable bag is treated beforehand with the lubricant composition by a procedure similar to that used in production.

The coefficient of friction is measured using a dynamometer (at a rate of 100 mm/min). Five successive passes are performed on the same sample of inflatable bag, each time changing the sample of tire casing.

Lower values of the coefficient of friction mean better sliding properties of the lubricant composition.

The five passes give information on exhaustion of the lubricant composition during successive molding operations.

This sliding test is representative of the performance to be expected with the industrial equipment, and is a first criterion for selection.

Test of Durability

The durability of a lubricant composition corresponds to the number of tires produced without degradation of the surface of the inflatable bag. A film of inflatable bag, treated beforehand with the lubricant composition to be evaluated, is pressed in contact with a film of tire casing, unvulcanized, according to a series of pressing cycles and temperatures simulating the steps in the manufacture of a tire on industrial equipment.

The film of tire casing is replaced at each molding operation. The test is ended when the two surfaces in contact remain stuck together. The lubricant composition on the surface of the film of the inflatable bag is exhausted and no longer acts as a lubricating interface.

Table 6 below gives the coefficients of friction obtained at each pass for each of the lubricant compositions 1, 2 and 3 of examples 1, 2 and 3. The results were obtained after a week of storage of the lubricant compositions 1, 2 and 3.

TABLE 6 coefficient of friction

|  | Ex. 1 Composition 1 | Comp. Ex. 2 Composition 2 | Comp. Ex. 3 Composition 3 |
|---|---|---|---|
| 1st pass | 0.05 | 0.24 | 0.068 |
| 2nd pass | 0.06 | 0.23 | 0.115 |
| 3rd pass | 0.07 | 0.21 | 0.159 |
| 4th pass | 0.08 | 0.21 | 0.207 |
| 5th pass | 0.09 | 0.22 | 0.267 |
| Mean value | 0.07 | 0.22 | 0.16 |

It is clear from Table 6 that the coefficients of friction measured in the case of compositions 2 and 3 of comparative examples 2 and 3 are higher than those measured in the case of composition 1 according to the invention.

Table 7, given below, shows the durability of composition 1 according to the invention, and of compositions 2 and 3 of comparative examples 2 and 3.

TABLE 7

| Example | Durability |
|---|---|
| Example 1 | >20 |
| Comparative example 2 | >20 |
| Comparative example 3 | 12 |

The invention claimed is:

1. A method of preparation of a lubricant composition in the form of an oil-in-water emulsion, comprising the direct mixing of two oil-in-water emulsions (A) and (B) made beforehand, said preliminary emulsions (A) and (B) complying with following compositional characteristics (i) to (4i):

(i) preliminary emulsion (A) contains:

(a) at least one unreactive, linear polyorganosiloxane oil with lubricant properties, with a dynamic viscosity of the order of $5.10^{-2}$ to $30.10^2$ Pa.s at 25° C. and comprising a linear homopolymer or copolymer, of which, per molecule, the monovalent organic substituents, which may be identical to or different from one another, bound to the silicon atoms, are selected from the group consisting of alkyl, cycloalkyl, alkenyl, aryl, alkarylene and aralkylene radicals;

(b) at least one polyorganosiloxane resin bearing, before emulsification, condensable hydroxyl substituents and comprising, before emulsification, at least two different siloxyl units selected from the group consisting of formula $(R^1)_3SiO_{1/2}$ (M); $(R^1)_2SiO_{2/2}$ (D); $R^1SiO_{3/2}$ (T) and $SiO_{4/2}$ (Q), at least one of these units being a T or Q unit, and $R^1$ in these formulae representing a monovalent organic substituent, the average number per molecule of organic radicals $R^1$ per silicon atom being between 1 and 2; and said resin having a content by weight of hydroxyl substituents ranging from 0.1 to 10 wt. %;

(c) at least one crosslinking agent that is soluble in the silicone phase and has at least two functions capable of reacting with the polyorganosiloxane resin(s) (b);

(d) a condensation catalyst capable of catalyzing the reaction of constituent (b) with constituent (c);

(e) a surfactant; and (f) water, (2i) preliminary emulsion (B) comprises:

(a') at least one reactive linear polyorganosiloxane oil containing at least two OH groups per molecule and with a dynamic viscosity in the range from $5.10^{-2}$ to $30.10^2$ Pa.s at 25° C.; and the constituents (b), (c), (d), (e) and (f) mentioned above in relation to the composition of preliminary emulsion (A);

(3i) each of the preliminary emulsions (A) and (B) has the following composition by weight, and the composition by weight of (A) can be identical to or different from that of (B):

from 5 to 95 parts by weight of constituent (a) for emulsion (A) or of constituent (a') for emulsion (B);

from 0.5 to 50 parts by weight of constituent (b);

from 0.1 to 20 parts by weight of constituent (c);

from 0.05 to 10 parts by weight of constituent (d);

per 100 parts by weight of the total of the constituents (a)=(b)=(c)=(d) or (a')=(b)=(c)=(d);

the quantities of surfactants and of water being sufficient to obtain an oil-in-water emulsion; and (4i) the weight ratio of emulsion (A) to emulsion (B), at the time of mixing of the preliminary emulsions, is in the range from 1.5 to 4.

2. The method as claimed in claim 1, wherein catalyst (d) is a tin-based catalyst.

3. The method as claimed in claim 2, wherein catalyst (d) is a dialkyltin dicarboxylate.

4. The method as claimed in claim 1, wherein constituent (c) is selected from the group consisting of organotrialkoxysilanes, the organotriacyloxysilanes, the organotrioximosilanes and the tetraalkyl silicates.

5. The method as claimed in claim 4, wherein constituent (c) comprises at least one alkyltrialkoxysilane of formula $YSiZ_3$ in which Y is ($C_1$-$C_6$) alkyl or ($C_2$-$C_8$) alkenyl, and Z is ($C_1$-$C_{10}$) alkoxy.

6. The method as claimed in claim 1, wherein constituent (a) comprises at least one unreactive linear polyorganosiloxane oil which is a linear homopolymer or copolymer in which, per molecule, at least 2% by number of the monovalent organic substituents bound to the silicon atoms are aryl, alkarylene and/or aralkylene radicals.

7. The method as claimed in claim 6, wherein constituent (a) is selected from the group consisting of linear polyorganosiloxanes:
  comprising along each chain:
    of units of formula $R^2R^3SiO_{2/2}$, optionally combined with units of formula $(R^2)_2SiO_{2/2}$,
    of units of formula $(R^3)_2SiO_{2/2}$, optionally with units of formula $(R^2)_2SiO_{2/2}$, and
    of units of formula $R^2R^3SiO_{2/2}$ and units of formula $(R^3)_2SiO_{2/2}$, optionally with units of formula $(R^2)_2SiO_{2/2}$,
  and blocked at each chain end by a unit of formula $(R^4)_3SiO_{1/2}$ in which the radicals $R^4$, which may be identical or different, are radicals $R^2$ and $R^3$;
  where the radicals $R^2$ and $R^3$, monovalent organic substituents of the various siloxyl units mentioned above, have the following definitions:
    the radicals $R^2$, identical to or different from one another, are selected from the group consisting of: the linear or branched $C_1$-$C_6$ alkyl radicals, the $C_3$-$C_8$ cycloalkyl radicals, and the linear or branched $C_2$-$C_8$ alkenyl radicals,
    the radicals $R^3$, identical to or different from one another, are selected from the group consisting of: the $C_6$-$C_{10}$ aryl radicals, the $C_6$-$C_{15}$ alkarylene radicals, the $C_6$-$C_{15}$ aralkylene radicals; and
  where 5 to 50% by number of the substituents $R^2$, $R^3$ and $R^4$ are aromatic radicals $R^3$.

8. The method as claimed in claim 7, wherein constituent (a) comprises at least one linear polyorganosiloxane:
  constituted along each chain:
    of units of formula $R^2R^3\ SiO_{2/2}$ combined with units of formula $(R^2)_2SiO_{2/2}$,
    of units of formula $(R^3)_2SiO_{2/2}$ combined with units of formula $(R^2)_2SiO_{2/2}$;
  and blocked at each chain end by a unit of formula $(R^2)_3SiO_{1/2}$;
  where the radicals $R^2$ and $R^3$ have the following definitions:
    the radicals $R^2$, identical to or different from one another, are selected from the group consisting of methyl, ethyl, propyl and isopropyl radicals,
    the radicals $R^3$, identical to or different from one another, are selected from the group consisting of phenyl, tolyl and benzyl radicals; and
  where 5 to 50% by number of the substituents $R^2$ and $R^3$ are phenyl, tolyl and/or benzyl radicals.

9. The method as claimed in claim 1, wherein constituent (a') comprises at least one polyorganosiloxane of formula:

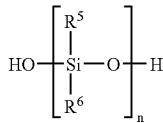

in which n is an integer greater than or equal to 10, $R^5$ and $R^6$, identical or different, represent: $(C_1$-$C_6)$ alkyl; $(C_3$-$C_8)$ cycloalkyl; $(C_2$-$C_8)$ alkenyl; $(C_5$-$C_8)$ cycloalkenyl; each of the aforesaid radicals optionally being substituted by a halogen atom or a cyano residue.

10. The method as claimed in claim 1, wherein each resin of constituent (b) is a DT or hydroxylated MDT resin comprising at least 20 wt. % of units T and having a content by weight of hydroxyl groups in the range from 0.1 to 10%.

11. The method as claimed in claim 1, wherein each resin of constituent (b) has a dynamic viscosity at 25° C. in the range from 0.2 to 200 Pa.s.

12. The method as claimed in claim 1, wherein each preliminary emulsion (A) and (B) or just one of the two preliminary emulsions (A) or (B) additionally contains from 0.5 to 15 parts by weight, per 100 parts by weight of the sum of the constituents (a)=(b)=(c)=(d)=(g) or (a')=(b)=(c)=(d)=(g), of a constituent (g) comprising at least one water-soluble crosslinking agent selected from the group consisting of silanes and/or the hydroxylated polydiorganosiloxanes (POS), said crosslinking agent bearing, per molecule, in addition to at least one OH group, at least one organic group with an $F_r$ function, $F_r$ being selected from the group consisting of amino functions, optionally substituted, epoxy, acryloyl ($CH_2$=CH—CO) functions, optionally substituted, methacryloyl ($CH_2$=C($CH_3$)—CO—) functions, optionally substituted, ureido ($NH_2$—CO—NH—) functions, optionally substituted, thiol functions, optionally substituted and halogen.

13. The method as claimed in claim 12, wherein the crosslinking agent has the formula $R^8R^7N$—$R_aSi(OH)_3$ in which $R_a$ represents $(C_1$-$C_{10})$ alkylene and $R^7$ and $R^8$ represent a hydrogen atom or a $(C_1$-$C_6)$ alkyl group.

14. The method as claimed in claim 1, wherein each preliminary emulsion (A) and (B) or just one of the two preliminary emulsions (A) or (B) additionally comprises one or more additional ingredients selected from the group consisting of film-forming polymers, additional lubricants, antifriction agents, coalescing agents, wetting or dispersing agents, mineral fillers, agents for driving out air, antifoaming agents, thickeners, stabilizers, and preservatives.

15. The method as claimed in claim 1, wherein each preliminary emulsion (A) and (B) comprises, in identical or different quantity, from 0.5 to 10 wt. % of surfactant and from 40 to 95 wt. % of water.

16. The method as claimed in claim 1, which comprises the following steps (1) and (2):
  step (1) in which the preliminary emulsions (A) and (B) are prepared, at room temperature (23° C.), using the same procedure comprising the sequences α,β, and γ as follows:
    sequence α: form an emulsion in water (f), from a mixture of unreactive polydiorganosiloxane oil(s) (a) (in the case of emulsion (A)) or reactive polydiorganosiloxane oil(s) (a') (in the case of emulsion (B)), of polyorganosiloxane resin(s) (b), and of crosslinking agent(s) that are soluble in the silicone phase (c), in the presence of the surfactant (e), so as to prepare an emulsion of the oil-in-water type, if necessary by first preparing a thick oil-in-water phase, then secondly diluting the thick phase obtained with water,
    sequence β: add to the preceding emulsion, comprising all of the constituents (a) or (a'), (b), (c) and (e), an emulsion of the catalyst (d) in water,
    sequence γ: then if necessary dilute the medium with water as a function of the desired degree of dry extract;
  step (2) which comprises mixing, at room temperature (23° C. preliminary emulsion (A) and preliminary emulsion (B), operating with moderate stirring, in the proportions that were defined above in paragraph (4i) of the compositional characteristics of the preliminary emulsions (A) and (B).

17. The method as claimed in claim 16, wherein, when a water-soluble crosslinking agent (g) is incorporated in the preliminary emulsion or emulsions, it is added in the form of an aqueous solution, at the same time as the catalyst (d), to an oil-in-water emulsion comprising all of the constituents (a) or (a'), (b), (c) and (e).

18. A lubricant composition that can be obtained by employing the method as claimed in claim 1, comprising direct mixing of the two emulsions (A) and (B) made beforehand.

19. A method for the lubrication of an article comprising using the lubricant composition as claimed in claim 18.

20. The method as claimed in claim 19, wherein the following are carried out:
   lubrication of the inflatable rubber curing bag, during the operations of molding and vulcanization of pneumatic or semi-pneumatic tires, and/or
   lubrication of raw pneumatic or semi-pneumatic tires, with or without elements on their outer surface that will constitute the external tread that is to come into contact with the ground.

21. The method as claimed in claim 19, wherein the inflatable rubber bag, before being coated on its outer surface (that which comes into contact with the tire) with a lubricant composition undergoes a pre-treatment comprising applying, in any manner, a uniform layer of a primary composition that is in the form of an oil-in-water emulsion, said emulsion being obtained by the method comprising the direct mixing of the two oil-in-water emulsions (A) and (B) made beforehand, which are defined above, but this time using proportions of the two preliminary emulsions (A) and (B) such that the weight ratio of emulsion (A) to emulsion (B), at the moment of direct mixing, is now in the range from 0.1 to 0.7.

22. An article coated with a composition as claimed in claim 18.

23. An article that can be obtained by heating the article as claimed in claim 22.

24. The article as claimed in claim 22, comprising an inflatable rubber bag coated on its outer surface with the composition, for the molding and vulcanization of pneumatic or semi-pneumatic tires.

25. The article as claimed in claim 23, in that wherein the inflatable rubber bag is obtained by heating a coated bag to a temperature of 80 to 180° C.

26. The article as claimed in claim 22, which comprises a raw pneumatic or semi-pneumatic tire, with or without elements that will constitute its external tread that is to come into contact with the ground, coated on its inside surface with the composition.

27. A primary composition in the form of an oil-in-water emulsion, said emulsion being obtainable by the method as claimed in claim 1, comprising the direct mixing of the two oil-in-water emulsions (A) and (B) made beforehand, which are defined above, but this time using proportions of the two preliminary emulsions (A) and (B) such that the weight ratio of emulsion (A) to emulsion (B), at the moment of direct mixing, is now in the range from 0.1 to 0.7.

* * * * *